(12) United States Patent
Nobori

(10) Patent No.: US 8,451,508 B2
(45) Date of Patent: May 28, 2013

(54) PROJECTOR

(75) Inventor: Tatsuhiko Nobori, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 289 days.

(21) Appl. No.: 12/608,510

(22) Filed: Oct. 29, 2009

(65) Prior Publication Data

US 2010/0050125 A1 Feb. 25, 2010

Related U.S. Application Data

(63) Continuation of application No. 11/073,547, filed on Mar. 8, 2005, now Pat. No. 7,626,734.

(30) Foreign Application Priority Data

Mar. 15, 2004 (JP) ................................. 2004-072686

(51) Int. Cl.
*H04N 1/32* (2006.01)
*G09G 5/00* (2006.01)

(52) U.S. Cl.
USPC .......................................... 358/443; 345/156

(58) Field of Classification Search
USPC ............................ 358/442, 468, 471; 345/156
See application file for complete search history.

(56) References Cited

U.S. PATENT DOCUMENTS

| | | | |
|---|---|---|---|
| 4,037,250 A | | 7/1977 | McGahan et al. |
| 4,890,314 A | * | 12/1989 | Judd et al. .................. 348/14.01 |
| 4,992,866 A | | 2/1991 | Morgan |
| 2001/0019360 A1 | | 9/2001 | Tanaka et al. |
| 2002/0075244 A1 | | 6/2002 | Tani et al. |
| 2003/0002016 A1 | * | 1/2003 | Sellen et al. ..................... 353/31 |
| 2003/0017846 A1 | * | 1/2003 | Estevez et al. ................ 455/556 |
| 2003/0095183 A1 | | 5/2003 | Roberts et al. |
| 2004/0085343 A1 | * | 5/2004 | Jackson et al. ................ 345/726 |
| 2004/0140982 A1 | * | 7/2004 | Pate ............................... 345/600 |
| 2004/0175036 A1 | * | 9/2004 | Graham ........................ 382/173 |
| 2004/0223191 A1 | | 11/2004 | Murata et al. |
| 2004/0240709 A1 | * | 12/2004 | Shoemaker .................... 382/103 |
| 2005/0017924 A1 | * | 1/2005 | Utt et al. .......................... 345/32 |
| 2005/0060368 A1 | * | 3/2005 | Wang et al. .................... 709/204 |
| 2005/0069296 A1 | * | 3/2005 | Yoshida et al. ................ 386/111 |
| 2005/0073578 A1 | * | 4/2005 | Odlivak et al. .................. 348/65 |
| 2005/0083486 A1 | * | 4/2005 | Johnson ........................... 353/15 |
| 2006/0038877 A1 | * | 2/2006 | Richardson et al. ........ 348/14.08 |

(Continued)

FOREIGN PATENT DOCUMENTS

| | | |
|---|---|---|
| JP | A-06-110425 | 4/1994 |
| JP | A-2001-174915 | 6/2001 |

(Continued)

*Primary Examiner* — Jerome Grant, II
(74) *Attorney, Agent, or Firm* — Oliff & Berridge, PLC

(57) ABSTRACT

Aspects of the invention provide a projector capable of projecting desired image information by enabling the user to select easily and promptly an image input interface terminal into which the desired image information is inputted, among image input interface terminals. The projector can include image input I/Fs into which image signals from image input devices are inputted, a touch panel having a liquid crystal display to display image information inputted from the image input I/Fs, a thumbnail generating portion to generate thumbnail images to be displayed on the liquid crystal display, and a changeover switch to selectively switch the image input I/Fs by operations on the touch panel. Image information inputted from the selected image I/F can be projected. This enables the user to select desired image information promptly for the desired image information to be projected.

11 Claims, 4 Drawing Sheets

U.S. PATENT DOCUMENTS

| | | | |
|---|---|---|---|
| 2006/0170874 A1* | 8/2006 | Yumiki et al. | 353/42 |
| 2007/0108990 A1 | 5/2007 | Oguchi et al. | |
| 2008/0044802 A1* | 2/2008 | Leonard et al. | 434/322 |
| 2008/0239102 A1 | 10/2008 | Okada et al. | |
| 2008/0282195 A1 | 11/2008 | Nakagawa et al. | |
| 2010/0014007 A1* | 1/2010 | Kotani | 348/744 |
| 2010/0212087 A1* | 8/2010 | Leib et al. | 5/81.1 R |

FOREIGN PATENT DOCUMENTS

| | | |
|---|---|---|
| JP | A-2001-258846 | 9/2001 |
| JP | A-2002-27411 | 1/2002 |
| JP | A-2002-281382 | 9/2002 |
| JP | A-2003-087673 | 3/2003 |
| JP | A-2003-323168 | 11/2003 |

* cited by examiner

PROJECTOR

This is a Continuation of U.S. patent application Ser. No. 11/073,547 filed on Mar. 8, 2005, which is hereby incorporated by reference in its entirety. This application claims priority to Japanese Patent Application No. 2004-072686 filed Mar. 15, 2004, which is hereby incorporated by reference in its entirety.

BACKGROUND

Aspects of the invention can relate to a projector to project desired image information by enabling the user to select easily and promptly an image input interface terminal into which the desired image information is inputted among image input interface terminals.

In a case where plural video signals are outputted from a video signal supply portion, a system in which a VTR selection region, a VTR operation region, and a preview screen region of a selection operation control portion can be provided in an input display board on the screen, and the user performs selection operation to display a video signal selected by controlling the video signal supply portion on the preview screen region, so that a video signal outputted from the video signal supply portion is supplied to the projector, serving as video signal display means, under the control of the selection operation control portion for a video to be projected onto a screen can be used. See, for example, JP-A-6-110425 (page 3 and page 4, FIG. 1).

SUMMARY

According to a desired video signal is selected while the contents of video signals from plural video signal supply sources stored in the video signal supply portion are displayed on the preview screen in the input display board. However, because only one video signal (video) is displayed on the preview screen, plural operation buttons corresponding to the plural video signal supply sources need to be provided and the user has to operate these operation buttons repetitively until the user obtains a desired video. This poses a problem that it takes quite long until the user obtains a desired video, which becomes burdensome to the user. In addition, the operation buttons have to be provided in the matching number with the video signal supply sources, which raises a problem that a larger space is needed.

An aspect of the invention can provide a projector capable of projecting desired image information by enabling the user to select easily and promptly an image input interface terminal into which the desired image information is inputted among image input interface terminals connected to image input devices.

An exemplary projector of the invention can include image input interface terminals into which image signals from image input devices are inputted, an operation potion having a display portion to display image information inputted from the image input interface terminals, a thumbnail generating portion to generate thumbnail images of the image information to be displayed on the display portion, and a changeover switch to selectively switch the image input interface terminals by operations on the operation portion. Image information inputted from a selected image input interface terminal can be projected.

Herein, for example, a video terminal, an S-Video terminal, a 3RCA terminal, a D-Sub terminal, an HDMI (High-Definition Multimedia Interface) terminal, etc. are provided as the image input interfaces. Hereinafter, the image input interface terminals are also referred to as image input I/Fs. Also, image information includes video information.

According to this invention, image signals inputted from the image input I/Fs can be displayed on the display portion provided to the projector in the form of thumbnails. Hence, when plural image input devices are connected to the projector, the user is able to select desired image information promptly in a short time by visually confirming images displayed on the display portion.

In addition, by switching the changeover switch to a desired image input I/F by selectively operating the operation portion, the user is able to select a desired image inputted from this image input I/F easily for the desired image to be projected.

Also, in the configuration described above, it is preferable that the operation portion is a touch panel through which the display portion is visually confirmed.

Herein, for example, a liquid crystal display can be adopted as the display portion, and the touch panel can be disposed on the top surface thereof as the operation portion. The touch panel is made of a transparent member, such as synthetic resin and glass, and transparent electrodes are provided on the surface to form touch keys.

According to this invention, image information inputted from the image input I/F can be displayed on the display portion, and the user is able to see the image information by looking through the touch panel. Hence, the user is able to select an image input I/F easily and promptly for the desired image to be projected by merely touching a specific position on the touch panel with his finger (hereinafter, this operation is referred to as the touch-key operation).

In addition, it is preferable that the display portion displays at least displays of the image input interface terminals, and the thumbnail images of the image information inputted from the image input interface terminals.

On the display portion are displayed, for example, "Video", "S-Video", "3RCA", "D-Sub", "HDMI", etc. corresponding to the image input I/Fs specified above. Hence, the user is able to select the image input I/Fs on display with the use of the touch panel, and the input image information is displayed on the display portion in the form of thumbnails. The user is thus able to select the image input I/F into which a desired image signal is inputted without fail by looking the images displayed in the form of thumbnails.

Moreover, it is preferable that, of all items of the image information, an item of image information inputted from the image input interface terminal selected by the operation portion is outputted from the thumbnail generating portion, and displayed on the display portion in the form of a thumbnail on the basis of output information.

According to this configuration, image information inputted from one image input I/F selected from the image input I/Fs can be displayed on the display portion in the form of a thumbnail, and the user is thus able to select a desired image without fail for the desired image to be projected. In addition, the user is also able to confirm items of image information from the image input I/Fs that are not being projected on the display portion, which makes it easier for the user to select a desired image.

Further, it is preferable that all items of image information inputted into the image input interface terminals can be outputted from the thumbnail generating portion, and a list of all items of the image information can be displayed on the display portion in the form of thumbnails on the basis of output information.

According to this invention, a list of image information inputted from the image input I/Fs is displayed in the form of thumbnails, which makes it easier for the user to confirm which item of image information is inputted from which image input I/F. Also, the user is able to confirm promptly which image input I/F is connected to the projector, or into which image input I/F an image signal is inputted. In this instance, it is easier to understand by displaying, for example, "No-Signal", for the image input I/F that is not connected, or into which no image signal is inputted.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

An exemplary embodiment of the invention will now be described with reference to the accompanying drawings. FIG. 1 through FIG. 5 show a projector according to an exemplary embodiment of the invention.

Figure 1:
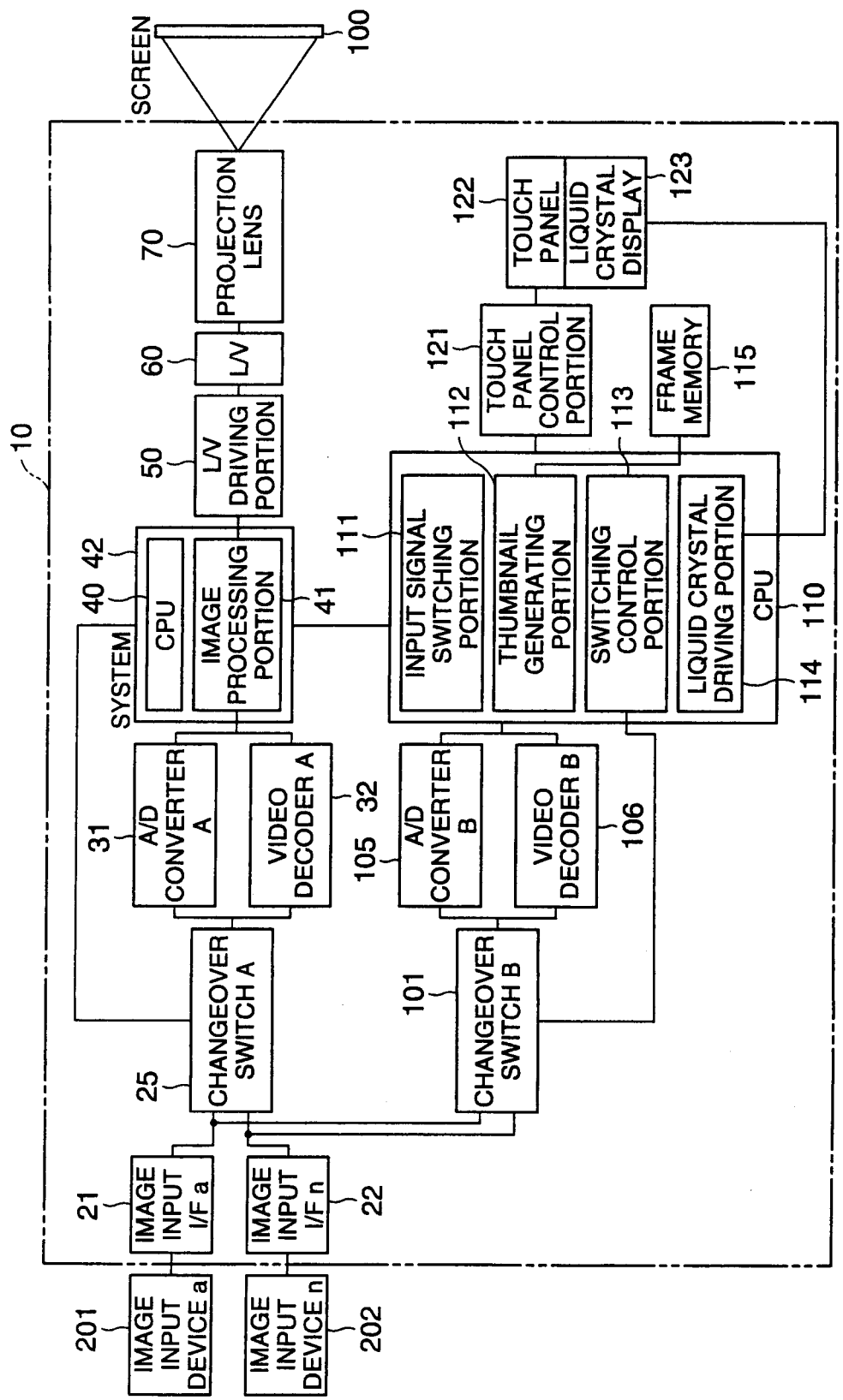
FIG. 1 is a schematic explanatory view of a projector according to an example of the invention.
Figure 2:
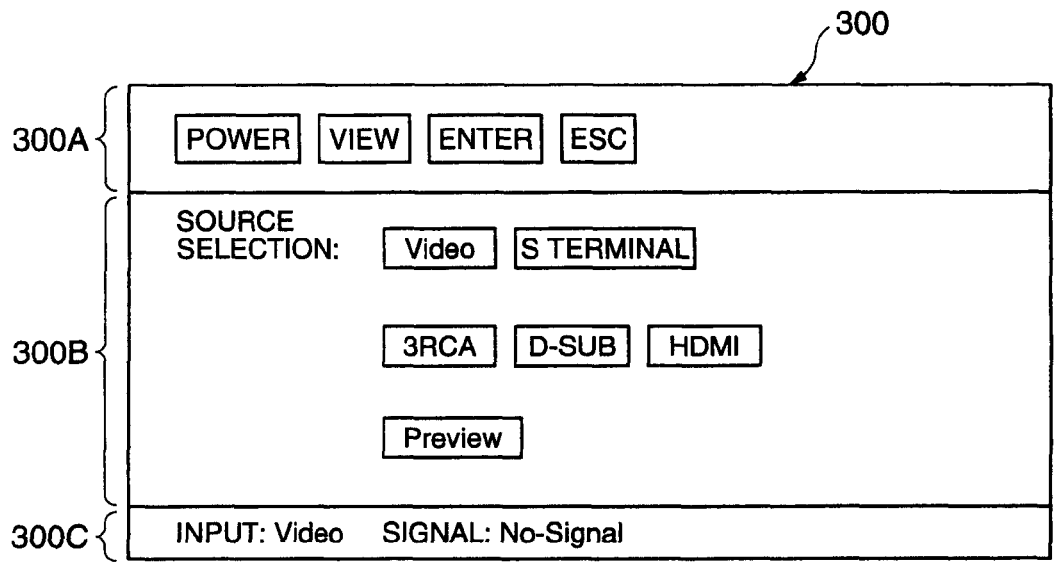
FIG. 2 shows a screen displayed on a display portion of the projector according to the example of the invention.
Figure 3:
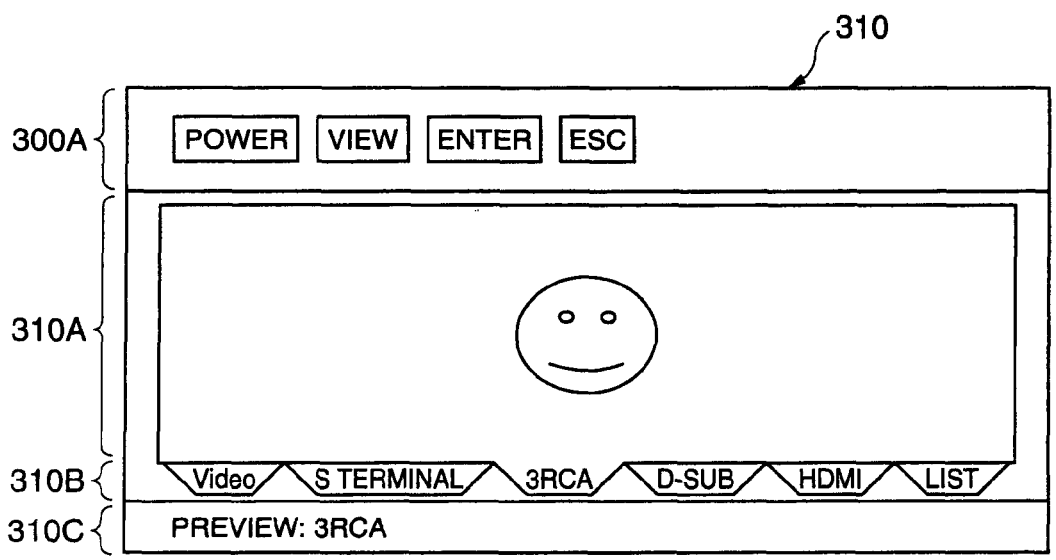
FIG. 3 shows a preview screen on the projector according to the example of the invention.
Figure 4:
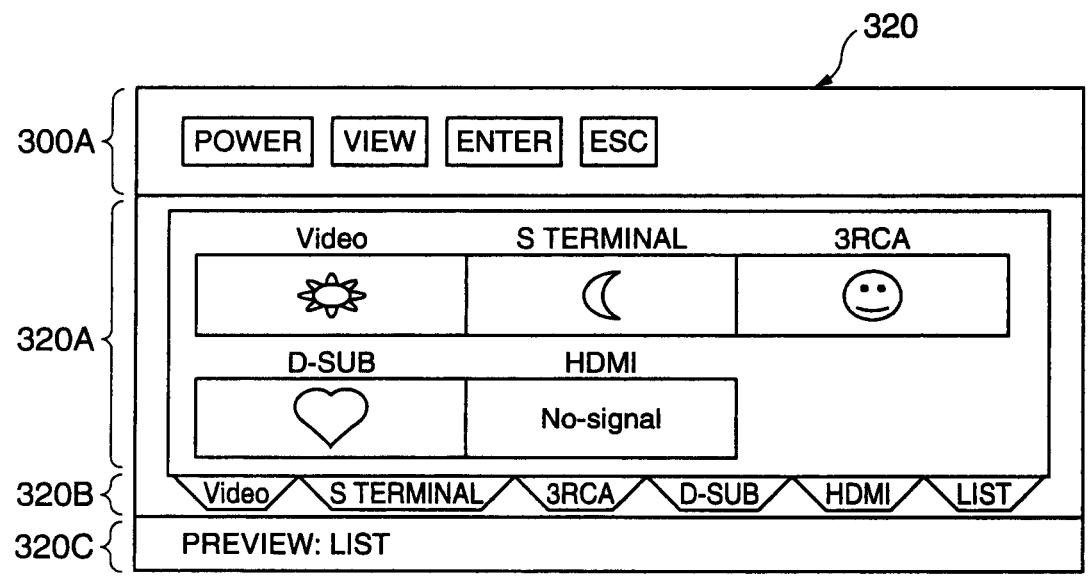
FIG. 4 shows a preview screen (display of a list) on the projector according to the example of the invention.
Figure 5:
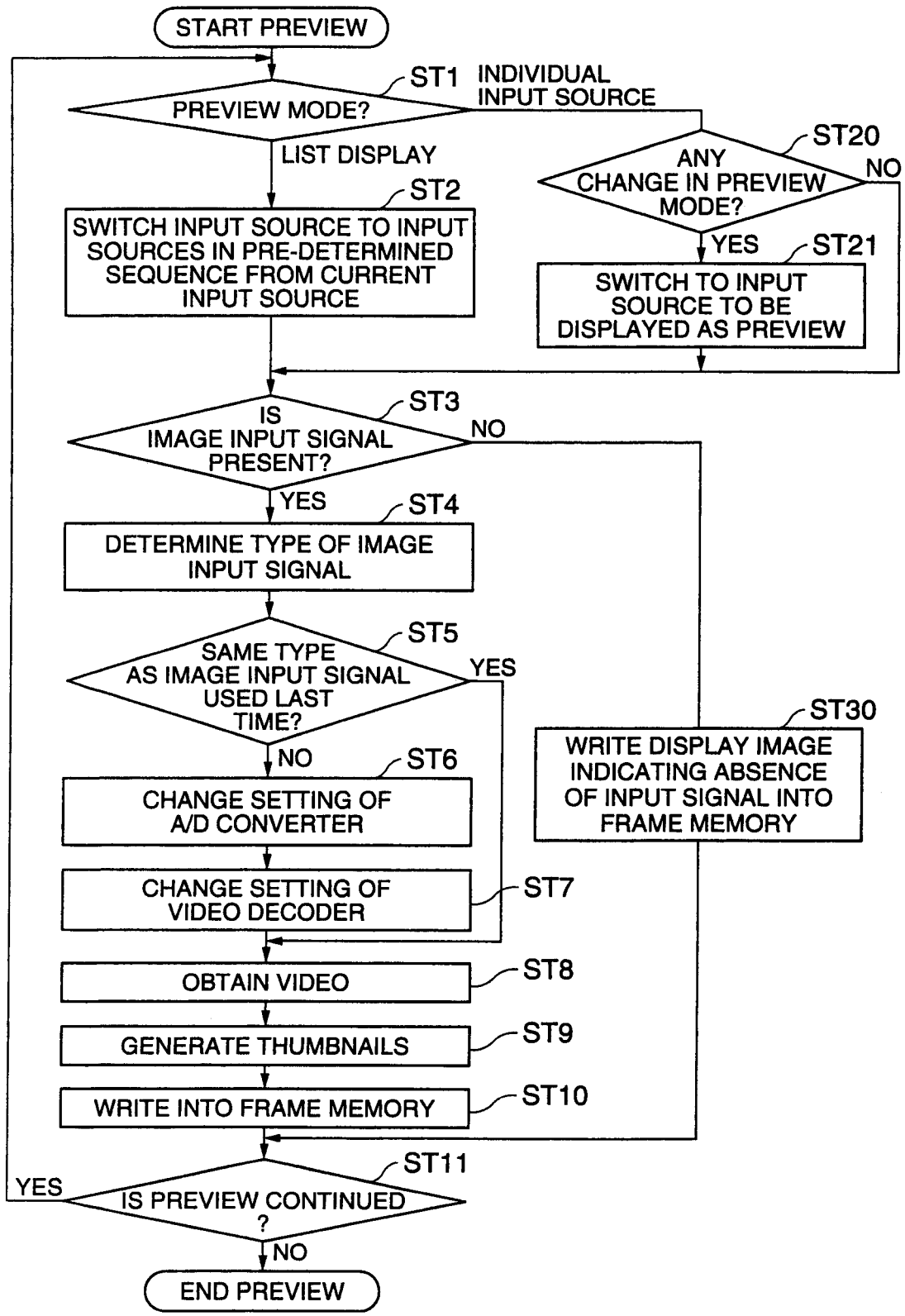
FIG. 5 is a flowchart detailing the operation flow of the projector according to the example of the invention.

FIG. 1 through FIG. 5 show a projector as one example of the invention. FIG. 1 is a schematic explanatory view of a projector 10 of this example. FIG. 2 through FIG. 4 show a preview screen of a liquid crystal display 123. FIG. 5 shows the flowchart according to this example. Referring to FIG. 1, the projector 10 according to this example of the invention can include an image input I/Fs 21 and 22 used as image input I/Fs into which image input signals respectively from image input devices 201 and 202, such as a personal computer and a video player, are inputted, a changeover switch A25 to selectively switch between image signals inputted from the image input I/Fs 21 and 22, an A/D converter A31 to convert analog signals inputted from the image input devices 201 and 202 into digital signals, a video decoder A32 to convert a video signal into R (red), G (green), and B (blue) image signals, an image processing portion 41 to convert image signals outputted from the A/D converter A31 and the video decoder A32 into projection image signals, an L/V (light valve) 60, an L/V driving portion 50 to drive the L/V 60 under control, and a projection lens 70 serving as a projection system to project an image emitted from the L/V 60 onto a screen 100.

The image processing portion 41 can form a main circuit portion 42 together with a system CPU 40 that controls the overall system of the projector 10. Operations until image input signals inputted from the image input devices 201 and 202 are projected onto the screen 100 are omitted from the drawing; however, these operations are controlled by a program installed inside.

FIG. 1 shows two image input devices: the image input device a 201 (hereinafter, referred to as the image input device 201) and the image input device n 202 (hereinafter, referred to as the image input device 202). However, it should be understood that the image input devices are not limited to two, and as many image input devices as image input I/Fs can be connected. Although it will be described in detail below (see FIG. 2 through FIG. 4), this example will describe the case of using five image input devices by way of example.

Further, the projector 10 of this example can include a changeover switch B101 to selectively switch between the image input I/Fs 21 and 22, an A/D converter B105 to convert input image signals into display image signals, a video decoder 106; a thumbnail generating portion 112 to generate thumbnails on the basis of the display image signals, a frame memory 115 to store the thumbnails, an input signal switching portion 111 to set the sequence in which the thumbnails are stored into the frame memory 115, a liquid crystal driving portion 114 to drive under control a liquid crystal display device 123 that displays the thumbnail images, a touch panel 122 superimposed on the top surface of the liquid crystal driving portion 114 to be used as an operation portion and made of a transparent member for allowing visual confirmation of the liquid crystal display device 123, a touch panel control portion 121 to control the touch-key operation on the touch panel 122, and a switching control portion 113 to control the switching of the changeover switch B101 by the touch-key operation.

The switching control portion 113, the thumbnail generating portion 112, the input signal switching portion 111, and the liquid crystal driving portion 114 are all stored in a CPU 110.

Operations based on the configuration described above will now be described.

Firstly, an image projection system (the flow through the upper row in FIG. 1) will be described. Items of image information from the image input devices 201 and 202 are inputted into the image input I/Fs 21 and 22 corresponding to these image input devices, and one of them is selected by the changeover switch A25, which is then inputted into the A/D converter A31 or the video decoder A32.

The A/D converter A31 converts an analog signal to a digital signal, while the video decoder A32 converts input image data, for example, in NTSC, into a digital signal, and the digital signal is outputted to the image processing portion 41.

The image processing portion 41 can convert the image data inputted from the A/D converter A31 or the video decoder A32 to a display image signal by frame rate conversion, scaling processing and the like, and inputs the display image signal into the L/V driving portion 50.

The L/V driving portion 50 can supply the L/V 60 with the display image signal inputted from the image processing portion 41 in the form of final R-, G-, and B-signals. The L/V 60 combines the R-, G-, and B-signals to form a projection image, which is projected onto the screen 100 from the projection lens 70.

Secondly, operations related to the thumbnail display (the flow through the bottom row in FIG. 1), which are the characteristic of the invention, will be described. Items of image information from the image input devices 201 and 202 are inputted into the image input I/Fs 21 and 22 corresponding to these image input devices, and one of them is selected by the changeover switch B101, which is then inputted into the A/D converter B105 or the video decoder B106.

The A/D converter B 105 can convert an analog signal to a digital signal, while the video decoder B106 converts input image data, for example, in NTSC, to a digital signal, and the digital signal is then inputted into the thumbnail generating portion 112.

The thumbnail generating portion 112 generates a thumbnail by scaling down the image data according to the preview mode and writes the thumbnail into the frame memory 115. In this instance, the input signal switching portion 111 sorts image signals to be inputted in the sequence pre-set in the frame memory 115.

The thumbnails thus generated are displayed on the liquid crystal display 123 by the liquid crystal driving portion 114.

The touch panel 122 is used to select the image input I/F into which image data that the user wishes to have it projected, from the thumbnails displayed on the liquid crystal display device 123 by the touch-key operation.

When the image input I/F is selected by the touch-key operation, the CPU 110 outputs a switch switching command to the main circuit portion 42 in the image projection system.

The main circuit portion 42 outputs the switch switching command to the changeover switch A 25.

The changeover switch A25 thereby switches to the image input I/F for the image data the user wishes to have it projected (to the image input I/F a 21 or the image input I/F n 202 in FIG. 1).

Desired image data is thus projected onto the screen 100 by way of the image projection system described above from the image input I/F selected in this manner.

A display screen on the liquid crystal display 123 used as the display portion will now be described with reference to FIG. 2 through FIG. 4.

FIG. 2 shows a display screen 300 displayed on the liquid crystal display 123 when the power supply of the projector 10 is turned ON. Referring to FIG. 2, an image input I/F display screen 300B is shown in the middle of the display screen 300, an operation screen 300A to specify the locations of the touch keys to control the projector 10 and the image input I/F display screen 300B is shown at the top, and a 300C to display information as to the type (for example, VGA and 480P) of a video signal inputted to the image input I/F currently selected is shown at the bottom. FIG. 2 shows a state where the video terminal is currently selected, and "No-Signal" is displayed for the video signal, indicating that no video signal is being inputted.

On the operation screen 300A are displayed: "POWER" used to turn ON/OFF the power supply of the projector 10, "VIEW" to move the display screen 300 to a position at an angle easy to see for the user when the projector 10 has moved with respect to the position of the user; "ENTER" to project image information inputted from the selected image input I/F, and "ESC" to return the screen to the initial screen. Electrodes of the touch panel 122 are provided to the positions corresponding to these displays to form touch keys corresponding to the respective displays.

Because the displays on the operation screen 300A are fixed, they may be displayed on the touch panel 122.

Also, on the image input I/F display screen 300B are displayed: "Video", "S-Video", "3RCA", "D-Sub", and "HDMI" representing the image input I/Fs to which the image input devices are connected. "Preview" to display an image of the desired image input I/F selected from these displays is also displayed. Electrodes corresponding to these displays are formed in the touch panel 122 to form touch keys corresponding to the respective displays.

FIG. 3 shows a preview screen 310 when one desired image input I/F (herein, 3RCA terminal) is selected from the plural image input I/Fs. Referring to FIG. 3, the operation screen 300A can be displayed at the top of the preview screen 310, and image information 310A of the selected image input I/F (3RCA) is displayed in the from of a thumbnail in the region within the image input I/F display screen 300B. When the user touches "ENTER" on the operation screen 300A under these conditions, an image based on the image signal inputted into the selected image input I/F is projected onto the screen 100.

Also, a list display screen 310B to display a list of all the image input I/Fs and "LIST" in the form of tabs is shown at the bottom of the image information 310A.

An image input I/F selection screen 310C to display the selected image input I/F is shown at the bottom of the preview screen 310.

By displaying "3RCA" in the form of a tab hollow on the inverse background, it is possible to judge which of the image input I/Fs in the tab display column is currently selected. When configured in this manner, the image input I/F selection screen 310C can be omitted.

As with the 300C, information of the video signal being inputted into the image input I/F on preview display may be displayed on a 310C.

When an image input I/F other than "3RCA" described above by way of example is selected, a desired image input I/F is selected by selecting a tab for the desired image to be displayed. In this instance, when the tab labeled with "LIST" is selected, a list of image information of the image input I/Fs, which will be described below, is displayed (see FIG. 4).

Display contents when a list of thumbnails of image information inputted from the image input I/Fs is displayed on the liquid crystal display device 123 will now be described with reference to FIG. 4. Referring to FIG. 4, the operation screen 300A is shown at the top of the preview screen 320, and a list display screen 320A displays a list of thumbnails of all the image input I/Fs into which image input signals are inputted. Also, tabs 320B to move to the preview screen of an individual image input I/F are provided at the bottom of the list display screen 320A. A 320C at the bottom of the preview screen 320 displays a state that a list is currently displayed (Preview: List, in the drawing).

For an image input I/F into which an image input signal is being inputted, corresponding image information is displayed in the form of a thumbnail. For an image input I/F to which the image input device is not connected or an image input I/F into which an image input signal is not inputted, "No-Signal" is displayed. FIG. 4 shows a state where no image input signal is inputted into the "HDMI" terminal. Items of image information of the respective image input I/Fs to be displayed are sorted at the positions pre-written in the frame memory 115, and then displayed on the preview screen 320 after the image size is changed.

The user confirms the images (image input I/Fs) displayed on the list display screen 320A, and performs the touch-key operation on the image he wishes to have it projected and the touch-key operation on "ENTER". Image information inputted from the desired image input I/F is thus projected onto the screen 100.

When the touch-key operation is performed on the image the user wishes to have it projected, the kind of the selected image input I/F as well as information of the image signal being inputted therein may be displayed on the 320C.

Selection of the image input I/Fs and the operation flow of the preview screen display will be described with reference to the flowchart of FIG. 5.

FIG. 5 is a flowchart detailing an exemplary operation flow according to this example of the invention. The description will be given also with reference to FIG. 1 through FIG. 4. Referring to FIG. 5, when the power supply of the projector 10 is turned ON, as is shown in FIG. 2, a list of names of the image input I/Fs that can be connected to the projector 10 is displayed on the liquid crystal display 123. Hence, a preview mode can be selected in ST1. Herein, whether an individual image input I/F (denoted as input source in the drawing) or a list of the image input I/Fs is selected is determined. In this instance, the image input I/F display screen 300B is displayed in the state used last time.

When an individual image input I/F is selected, whether the display has been changed from the image input I/F already shown as a preview is judged in ST20. The flow proceeds to ST3 in the absence of a change. In the presence of a change, the display is switched to the image input I/F (input source) to be displayed on the preview screen 310 in response to the touch-key operation on the display portion of the image input I/Fs on the touch panel 122 (ST21). This example shows a case where "3RCA" is selected (see FIG. 3).

When a display of a list of image input I/Fs (see FIG. 4) is selected in ST1, the image input I/F (input source) is switched to the image input I/Fs (input sources) in the pre-determined sequence from the image input I/F (input source) currently displayed by the changeover switch B101 (ST2). Subsequently, whether an input signal is inputted from the image input I/F on display is judged (ST3). When the absence of an input signal is judged, a display image indicating "no input signal" is written into the frame memory 115 (ST30). For example, a display like "HDMI" in the 320A of FIG. 4 will be displayed.

When the presence of an image input signal is judged in ST3, the type of the image input signal is judged (ST4). Subsequently, whether the type of the image input signal is the same type used when the thumbnail display image was generated last time is judged (ST5). When the image input signal is the same as the one used last time, the flow proceeds to ST8 to obtain an image. When the image input signal is judged as being different from the one used last time, the setting of the A/D converter B105 is changed (ST6) and the setting of the video decoder B106 is changed (ST7) according to the image input signal from the image input device.

Subsequently, images from the image input devices 201 and 202 corresponding to the connected image input I/Fs are obtained (ST8), and thumbnails of the image data scaled down according to the preview mode are generated in the thumbnail generating portion 112 (ST9). The thumbnail images are then written into the frame memory 115 (ST10). When written into the frame memory 115, image signals to be inputted are sorted in the sequence pre-set in the frame memory 115 by the input signal switching portion 111. In subsequent ST11, when the display of the preview screen (preview mode) is continued, the flow returns to ST1 to perform the steps described above; otherwise, the step is terminated.

The steps from the start of the preview to the end of the preview are controlled by a program installed in the CPU 110.

As has been described, a thumbnail image can be generated in the thumbnail generating portion 112 on the basis of an image signal inputted from the selected image input I/F, and changed into an adequate image size to be written into the frame memory 115. The thumbnail images are displayed on the liquid crystal display 123, either solely or all together in the form of a list.

To display an individual image input I/F on the preview screen 310 (see FIG. 3), the image input I/F (3RCA in FIG. 3) can be selected, and the changeover switch B1010 is set to this particular image input I/F. The image information 310A of the image input I/F is changed in size to match with the size of the preview screen 310, and then written into the frame memory 115. The image information written into the frame memory 115 is thus displayed. When the touch-key operation is performed on the "ENTER" display portion under these conditions, the changeover switch A 25 is switched to the 3RCA terminal, and image information is projected onto the screen 100 from the projection lens 70.

To display a list of the image input I/Fs (see FIG. 4), image information inputted from the image input I/Fs is written into pre-allocated regions in the frame memory 115 by switching the changeover switch B101 at regular time intervals (for example, at time intervals of ⅟₁₀ s), and image information from all the image input I/Fs is read out from the frame memory 115 to be displayed. In this case, the image of the image input I/F that is not selected by the changeover switch B101 is displayed as a still image that has been written into the frame memory 115. The user selects a particular image input I/F while watching these images. When the touch-key operation is performed on the "ENTER" display portion under these conditions, the changeover switch A 25 is switched to the selected image input I/F, and image information inputted from this image input I/F is projected onto the screen 100.

Hence, according to this example, because an image signal inputted from the image input I/F is displayed in the form of thumbnail on the liquid crystal display 123 provided to the projector 10, when plural kinds of image signals are inputted into the projector 10, the user is able to select desired image information promptly in a short time by visually confirming images displayed on the liquid crystal display 123.

In addition, by switching the changeover switch A 25 to a desired image input I/F by the touch-key operation on the touch panel 122, the user is able to select a desired image inputted from this selected image input I/F easily for the desired image to be projected.

The user can see the image information, inputted from the image input I/Fs and displayed in the form of thumbnails, by looking through the touch panel 122, and is therefore able to select an image input I/F by merely performing the touch-key operation at a specific position in the touch panel 122 with his finger. This can provide an advantage that the operation is easy. In addition, a space is used efficiently because both the touch panel 122 and the liquid crystal display 123, having the ability to display a large quantity of information, are thin and easy to operate.

Further, the liquid crystal display 123 displays a list corresponding to the image input I/Fs. Hence, by selecting the displayed image input I/Fs with the use of the touch panel 122, image information to be inputted therein can be displayed on the display portion in the form of thumbnails. The user is thus able to select the image input I/F into which a desired image signal is inputted without fail by looking the thumbnails on display.

Moreover, it is possible to display image information inputted from one image input I/F selected from the image input I/Fs or a list of image information inputted from all the image input I/Fs including image information that is not being projected in the form of thumbnails, the user is able to select desired image information easily for the desired image to be projected.

It should be appreciated that the invention is not limited to the example above, and modifications and improvements within the spirit and scope of the invention.

For example, the example above described a projector equipped with plural image input I/Fs. However, even when there is only one image input I/F, image information inputted from the image input device can be projected while the user is confirming the image information by displaying the image information on the display portion.

Also, in the example above, one image input I/F or a list of plural image input I/Fs is displayed in the form of thumbnails. However, for example, it is possible to display plural items of image information on the display screen used to display one item of image information as is shown in FIG. 3, by sequentially switching from item to item at regular time intervals. When configured in this manner, easy-to-see images can be displayed in a small space.

In addition, the example above described a projector using a liquid crystal light valve by way of example. However, it should be understood that the invention is not limited to this configuration, and the same advantages as described above can be attained with a projector using a micro-mirror or the like. Further, the liquid crystal display was adopted as the display portion; however, other thin electro-optic display devices can be adopted as well.

Hence, according to the example above, it is possible to provide a projector capable of projecting desired image information by enabling the user to select easily and promptly an image input I/F into which the desired image information is inputted among image input I/Fs connected to image input devices.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
    an image input interface terminal receiving image information from an image input device;
    a thumbnail generating portion generating a thumbnail image of the image information inputted from the image input interface terminal;
    a display portion displaying the thumbnail image;
    a selector for a selection of the thumbnail image displayed in the display portion; and
    a projection portion projecting an image based on the image information inputted from the image input interface terminal related to the selected thumbnail image, wherein the display portion is operatively connected to the projector.

2. The projector according to claim 1,
    the display portion provides a preview area therein to show the image.

3. The projector according to claim 1,
    the display portion provides a decision button therein to determine the selection of the thumbnail image, and
    the projection portion projects the image that is based on the image information inputted from the image input interface terminal related to the thumbnail image selected by operation of the decision button.

4. The projector according to claim 1, further comprising:
    additional image input interface terminals receiving image information from image input devices associated with the image input interface terminals; and
    the thumbnail generating portion generating thumbnail images of the image information inputted from the associated image input devices.

5. A method of controlling a projection comprising:
    receiving image information from an image input device by an image input interface terminal;
    generating a thumbnail image of the image information inputted from the image input interface terminal by a thumbnail generating portion;
    displaying the thumbnail image in a display portion;
    selecting the thumbnail image displayed in the display portion; and
    projecting an image in a projection portion based on the image information inputted from the image input interface terminal related to the selected thumbnail image, wherein the display portion is operatively connected to the projector.

6. The method according to claim 5, further comprising:
    providing a preview area in the display portion to show the image that is based on the image information inputted from the image input interface terminal related to the selected thumbnail image.

7. The method according to claim 5, further comprising:
    providing a decision button in the display portion to determine the selection of the thumbnail image.

8. The projector according to claim 1, wherein the display portion is disposed substantially on a surface of the projector.

9. The projector according to claim 1, wherein the projection portion does not project the thumbnail image.

10. The method according to claim 5, wherein the display portion is disposed substantially on a surface of the projector.

11. The method according to claim 5, wherein the projection portion does not project the thumbnail image.

* * * * *